US010803437B2

(12) United States Patent
 Vaddadi et al.

(10) Patent No.: US 10,803,437 B2
(45) Date of Patent: Oct. 13, 2020

(54) SELF-SERVICE TERMINAL TECHNICAL STATE MONITORING AND ALERTING

(71) Applicant: NCR Corporation, Duluth, GA (US)

(72) Inventors: Ramesh Vaddadi, Andhra Pradesh (IN); Krishna Kumari Rudraraju, Telangana (IN)

(73) Assignee: NCR Corporation, Atlanta, GA (US)

( * ) Notice: Subject to any disclaimer, the term of this patent is extended or adjusted under 35 U.S.C. 154(b) by 512 days.

(21) Appl. No.: 14/838,469

(22) Filed: Aug. 28, 2015

(65) Prior Publication Data

US 2017/0061413 A1    Mar. 2, 2017

(51) Int. Cl.
 *G06Q 20/20*    (2012.01)
 *G06F 21/57*    (2013.01)
 *H04L 29/08*    (2006.01)
 *H01L 29/08*    (2006.01)

(52) U.S. Cl.
 CPC ......... *G06Q 20/206* (2013.01); *G06F 21/575* (2013.01); *H04L 67/10* (2013.01)

(58) Field of Classification Search
 CPC ..... G06Q 20/206; G06F 21/575; H04L 67/10; G07F 19/209
 USPC .......................................................... 705/18
 See application file for complete search history.

(56) References Cited

U.S. PATENT DOCUMENTS

| | | | | |
|---|---|---|---|---|
| 6,802,028 B1 * | 10/2004 | Ruff | ...................... | G06F 21/567 714/25 |
| 7,278,053 B2 * | 10/2007 | Durica | ................ | G06F 11/1076 369/53.15 |
| 7,490,250 B2 * | 2/2009 | Cromer | ................. | G06F 21/554 713/194 |
| 7,849,011 B1 | 12/2010 | McCoy et al. | | |
| 8,103,909 B2 | 1/2012 | Hanna | | |

(Continued)

FOREIGN PATENT DOCUMENTS

| CN | 101676876 A | 3/2010 |
|---|---|---|
| CN | 102693379 A | 9/2012 |

OTHER PUBLICATIONS

M. E. Raj and A. Julian, "Design and implementation of anti-theft ATM machine using embedded systems," 2015 International Conference on Circuits, Power and Computing Technologies [ICCPCT-2015], Nagercoil, 2015, pp. 1-5. (Year: 2015).*

(Continued)

*Primary Examiner* — Ashford S Hayles
(74) *Attorney, Agent, or Firm* — Schwegman, Lundberg & Woessner

(57) ABSTRACT

Various embodiments herein each include at least one of systems, methods, and software for self-service terminal technical state monitoring and alerting. One such embodiment in the form of a method performed on a computer of an SST, such as an ATM or POS terminal, includes comparing at least one computer platform layer system configuration setting retrieved from a computer platform layer memory device of the SST to respective expected values stored in a second memory device of the SST. The method may then transmit an alert via a network to an alert repository including data identifying the SST when the comparing identifies at least one of the computer platform layer system configuration values does not match a respective expected value.

14 Claims, 4 Drawing Sheets

(56) References Cited

U.S. PATENT DOCUMENTS

| | | | | |
|---|---|---|---|---|
| 8,161,330 B1* | 4/2012 | Vannatter | G07F 9/026 | 235/380 |
| 8,214,290 B1* | 7/2012 | Vannatter | G06Q 10/00 | 370/254 |
| 8,395,500 B1* | 3/2013 | Dent | G08B 23/00 | 340/540 |
| 9,230,112 B1* | 1/2016 | Peterson | G06F 21/575 | |
| 9,240,924 B2 | 1/2016 | Maity et al. | | |
| 9,256,745 B2 | 2/2016 | Anderson et al. | | |
| 9,424,431 B2 | 8/2016 | Anderson et al. | | |
| 9,465,643 B1* | 10/2016 | Andrews | G06F 9/45558 | |
| 9,860,109 B2* | 1/2018 | Koverman | H04L 43/08 | |
| 10,075,429 B2* | 9/2018 | Jayanti Venkata | H04W 4/50 | |
| 2002/0065775 A1* | 5/2002 | Monaghan | G07F 19/20 | 705/43 |
| 2003/0110248 A1* | 6/2003 | Ritche | H04L 41/0613 | 709/224 |
| 2004/0044693 A1* | 3/2004 | Hadley | G06F 8/71 | |
| 2005/0097199 A1* | 5/2005 | Woodard | H04L 67/125 | 709/223 |
| 2005/0108516 A1* | 5/2005 | Balzer | G06F 21/52 | 713/150 |
| 2006/0117100 A1* | 6/2006 | Ogawa | H04L 67/025 | 709/223 |
| 2007/0150955 A1* | 6/2007 | Murase | H04L 63/1416 | 726/23 |
| 2007/0192867 A1* | 8/2007 | Miliefsky | H04L 63/20 | 726/25 |
| 2007/0199060 A1* | 8/2007 | Touboul | H04L 63/1416 | 726/11 |
| 2008/0056487 A1* | 3/2008 | Akyol | H04L 63/0428 | 380/2 |
| 2009/0126003 A1* | 5/2009 | Touboul | H04L 29/1233 | 726/13 |
| 2009/0199053 A1* | 8/2009 | Neilan | G07F 19/20 | 714/57 |
| 2010/0070800 A1* | 3/2010 | Hanna | G06F 21/575 | 714/6.12 |
| 2011/0029766 A1* | 2/2011 | Sever | G06F 9/44505 | 713/2 |
| 2011/0078034 A1* | 3/2011 | Hayhow | G06Q 20/206 | 705/21 |
| 2011/0219453 A1* | 9/2011 | Turbin | G06F 21/00 | 726/24 |
| 2011/0225274 A1* | 9/2011 | Dvorkin | G06F 9/44505 | 709/222 |
| 2012/0151582 A1* | 6/2012 | Reasor | G06F 21/564 | 726/23 |
| 2012/0198553 A1* | 8/2012 | Suginaka | G06F 21/55 | 726/24 |
| 2012/0226895 A1 | 9/2012 | Anderson et al. | | |
| 2012/0272049 A1* | 10/2012 | Chang | G06F 3/0488 | 713/2 |
| 2012/0297177 A1* | 11/2012 | Ghosh | G06F 21/53 | 713/2 |
| 2013/0034109 A1* | 2/2013 | Cardona | H04L 12/4633 | 370/419 |
| 2013/0067534 A1* | 3/2013 | Soffer | G06F 21/83 | 726/2 |
| 2013/0219507 A1* | 8/2013 | Chang | G06F 21/60 | 726/26 |
| 2013/0339718 A1* | 12/2013 | Kanaya | G06F 11/3692 | 713/2 |
| 2014/0108786 A1* | 4/2014 | Kreft | H04L 63/0428 | 713/156 |
| 2015/0018089 A1* | 1/2015 | Caldas | G07F 17/3241 | 463/29 |
| 2015/0019856 A1* | 1/2015 | Kim | G06F 21/575 | 713/2 |
| 2015/0180997 A1* | 6/2015 | Ramanan | H04L 67/2842 | 709/214 |
| 2015/0186861 A1* | 7/2015 | Glatt | G06Q 20/382 | 705/71 |
| 2015/0199520 A1* | 7/2015 | Woolley | G06F 21/572 | 713/2 |
| 2015/0230108 A1* | 8/2015 | Sridhara | G06F 21/552 | 455/405 |
| 2016/0217283 A1* | 7/2016 | Liu | G06F 21/566 | |
| 2016/0292661 A1* | 10/2016 | Kwan | H04N 7/181 | |
| 2016/0306978 A1* | 10/2016 | Thadikaran | G06F 12/1466 | |
| 2016/0371163 A1* | 12/2016 | Swierk | G06F 11/2294 | |
| 2017/0185429 A1* | 6/2017 | Jeansonne | G06F 21/572 | |

OTHER PUBLICATIONS

R. Petrlic, "Integrity Protection for Automated Teller Machines," 2011IEEE 10th International Conference on Trust, Security and Privacy in Computing and Communications, Changsha, 2011, pp. 829-834. (Year: 2011).*

Atms Employ "Self-Healing" Software. E-Scan Newsletter. 2011;37(5):6-7. http://search.ebscohost.com/login.aspx?direct=true&db=bth&AN=61014368&site=ehost-live&scope=site. Accessed Jun. 7, 2020. (Year: 2011).*

Anonymous: "Intelligent Platform Management Interface—Wikipedia", Aug. 27, 2015 (Aug. 27, 2015), XO055333669, Retrieved from the Internet: URL:https:/en.wikipedia.org/w/index.php?title=Intellgent_Platform_Management_Interface&oldid=678176241 [retrieved on Jan. 10, 2017] *the whole document*.

European Search Report dated Jan. 24, 2016 issued in co-pending European Patent application No. EP16180346.5.

\* cited by examiner

SELF-SERVICE TERMINAL TECHNICAL STATE MONITORING AND ALERTING

BACKGROUND INFORMATION

Self-Service Terminals (SSTs), such as Automated Teller Machines (ATMs) and self-service Point-Of-Sale (POS) terminals, include significant security measures to protect currency stored therein and transaction services performed thereon. One such security measure is password protecting the Basic Input/Output System (BIOS) of a computer controlling the SST, such as to protect the boot device order. The reasoning is that if an SST were to boot from a removable media, such as an optical disc or a memory stick, software stored thereon could be executed to cause the SST to dispense currency, to load malicious code, or otherwise modify operation of the SST for malicious purposes. The boot device order and other BIOS settings are therefore secured. However, the BIOS settings may still be compromised (i.e., altered), but when they are compromised the fact that they have been compromised typically is not discovered until a technician physically visits an SST after fraudulent activity has been detected. Such fraudulent activity may include unauthorized dispensing of currency.

SUMMARY

Various embodiments herein each include at least one of systems, methods, and software for SST technical state monitoring and alerting. One such embodiment in the form of a method performed on a computer of an SST, such as an ATM or POS terminal, includes comparing at least one computer platform layer system configuration setting retrieved from a computer platform layer memory device of the SST to respective expected values stored in a second memory device of the SST. The method may then transmit an alert via a network to an alert repository including data identifying the SST when the comparing identifies at least one of the computer platform layer system configuration values does not match a respective expected value.

Another method embodiment includes retrieving at least one computer platform layer system configuration setting of an SST computer platform layer system and retrieving expected configuration setting from a second memory device of the SST. This method continues by comparing each of the at least one configuration settings to respective expected configuration settings retrieved from the second memory device. This method may then transmit an alert, via a network interface device of the SST to an alert repository, including data identifying the SST when the comparing identifies at least one of the computer platform layer system configuration values does not match a respective expected value.

A further embodiment in the form of a system, such as a computer controlling operation of an SST, includes a motherboard with at least one processor and at least one memory device thereon. The at least one memory device stores a platform layer system and configuration settings thereof. The platform layer system is executable according to the configuration settings by the at least one processor to perform platform layer services for the system including executing a system boot process. The system also includes a network interface device and a platform layer system monitoring and alerting module. The platform layer system monitoring and alerting module is operable to perform data processing activities. The data processing activities, in some embodiments, include retrieving at least one computer platform layer system configuration setting from the at least one memory device and retrieving expected configuration setting from the at least one memory device. The data processing activities in such embodiments may then compare each of the at least one configuration settings to respective expected configuration settings. When the comparing identifies at least one of the computer platform layer system configuration values does not match a respective expected value, the data processing activities include transmitting an alert, via the network interface device to an alert repository, including data identifying the SST.

DETAILED DESCRIPTION

Figure 1:
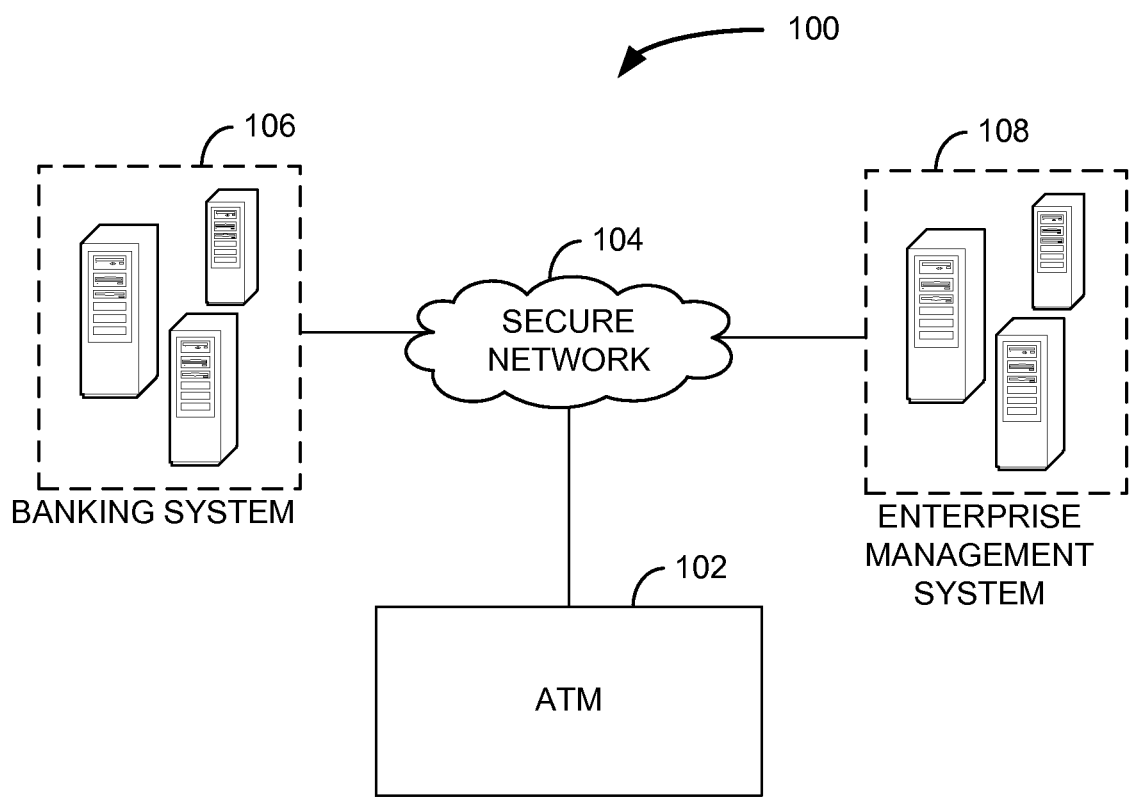
FIG. 1 is a logical block diagram of a system, according to an example embodiment.

Various embodiments herein each include at least one of systems, methods, and software for SST technical state monitoring and alerting. SSTs, such as ATMs and POS terminals, include a computer that controls operation of the SST and the various peripheral devices connected thereto. The peripheral devices may include currency cassettes, a currency dispenser, a display, one or more input devices, and the like. As the computer controls operation of the SST, should the computer become compromised, currency and other data stored on or passing through the SST may be compromised, stolen, or otherwise be subject to fraud activity. One way that SSTs may become compromised is loading of malicious code, programs, or processes from a storage device, such as a memory stick or optical disc. Code from such devices typically can only be loaded on SST at time of boot of the controlling computer. Thus, the boot device order is secured by computer platform layer system. However, the boot device order may still become compromised. However, other computer platform layer system may also be manipulated to compromise an SST. The various embodiments herein add a hardware or software element either as part of the computer platform layer system, as a firmware device embedded in or coupled to a motherboard of the computer controlling the SST, or otherwise to monitor configuration settings of the computer platform layer system, such as the boot device order. In other embodiments, an existing hardware element may be utilized, such as an out-of-band controller such that the various embodiments herein may monitor computer platform layer system configuration settings even when the computer is turned off. The monitoring of the computer platform layer system is performed in comparison to an expected set of configuration settings stored in on a volatile or non-volatile memory device. When a difference between a configuration setting and a respective expected configuration setting is detected, an alert is generated and provided. The alert may be sent to an enterprise management system of an entity operating the SST, an SST maintenance provider, an email or SMS account, other locations as may be configured in some embodiments, and the like.

A computer platform layer system is software system that first executes upon initialization of a computing device, such as a PC-based computer. Examples of a computer platform layer system include a BIOS and a Unified Extensible Firmware Interface (UEFI). Such computer platform layer system, when deployed with an SST, is typically secured to prevent tampering which can be exploited to alter or control operation of the SST for purposes of committing theft, fraud, and other illicit acts.

These and other embodiments are described herein with regard to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes an SST, such as an ATM 102, that is connected to a banking system 106 and an enterprise management system 108 via a secure network 104.

The secure network 104 is typically a network dedicated at least in part to communicating with SSTs, such as an ATM network. The secure network 104 may rely on secure networking protocols that allow secure data to be carried on other networks, such as the Internet. However, in some embodiments, the secure network 104 may be, at least in part, a physically secured network. The banking system 106 is generally a system involved in processing at least financial portions of transactions conducted via an SST, such as the ATM 102. The enterprise management system 106 is a system that monitors performance of SSTs, such as the ATM 102.

In operation, a platform layer system monitoring and alerting module is present on the ATM 102, or other SST-type, and monitors computer platform layer system configuration settings of a computer controlling operation of the ATM 102. The platform layer system monitoring and alerting module compares actual configuration settings of the computer platform layer system with stored expected values of the configuration settings. Some or all of such configuration settings may be the subject of the comparison. The subject configuration settings typically include at least a boot device order, by may include other or additional configuration settings. When a mismatch is detected, some embodiments include transmitting an alert over the secure network 104 to the enterprise management system 108. The enterprise management system 108 may then take further action, such as notifying security personnel or others that the SST, such as the ATM 102, from which the alert was received has likely been compromised. In some embodiments, the platform layer system monitoring and alerting module may further initiate a process to take the ATM 102 offline to prevent any further fraudulent activity.

In some embodiments, the platform layer system monitoring and alerting module compares configuration settings at a time when a computer boots. The platform layer system monitoring and alerting module may also or alternatively perform the configuration setting comparison at another time, periodically, on a scheduled or random basis, and the like.

Figure 2:
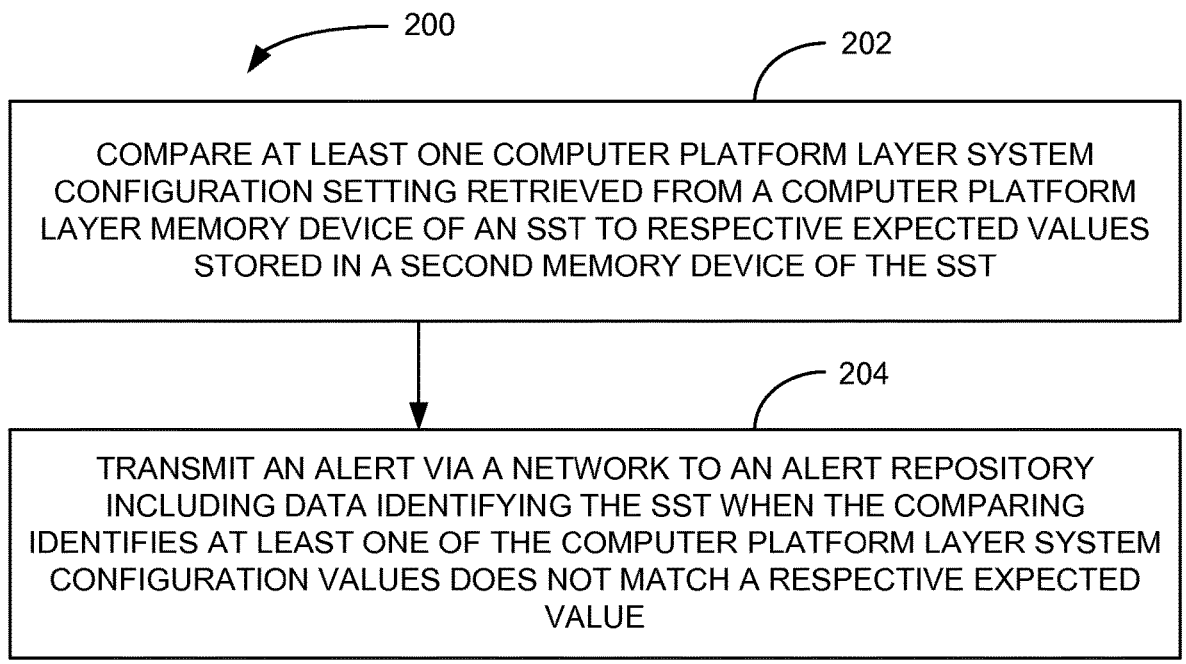
FIG. 2 is a block flow diagram of a method, according to an example embodiment.

FIG. 2 is a block flow diagram of a method 200, according to an example embodiment. The method 200 is an example of a method that may be performed by a computer platform layer system, a platform layer system monitoring and alerting module, or other element at the platform layer of a computer controlling operation of an SST or other computer.

The method 200 includes comparing 202 at least one computer platform layer system configuration setting retrieved from a computer platform layer memory device of an SST, or other computer, to respective expected values stored in a second memory device of the SST, or other computer. The method 200 further includes transmitting 204 an alert via a network to an alert repository including data identifying the SST, or other computer, when the comparing identifies at least one of the computer platform layer system configuration values does not match a respective expected value. In some such embodiments, the computer platform layer system is a BIOS, an UEFI, or other such platform layer system.

Figure 3:
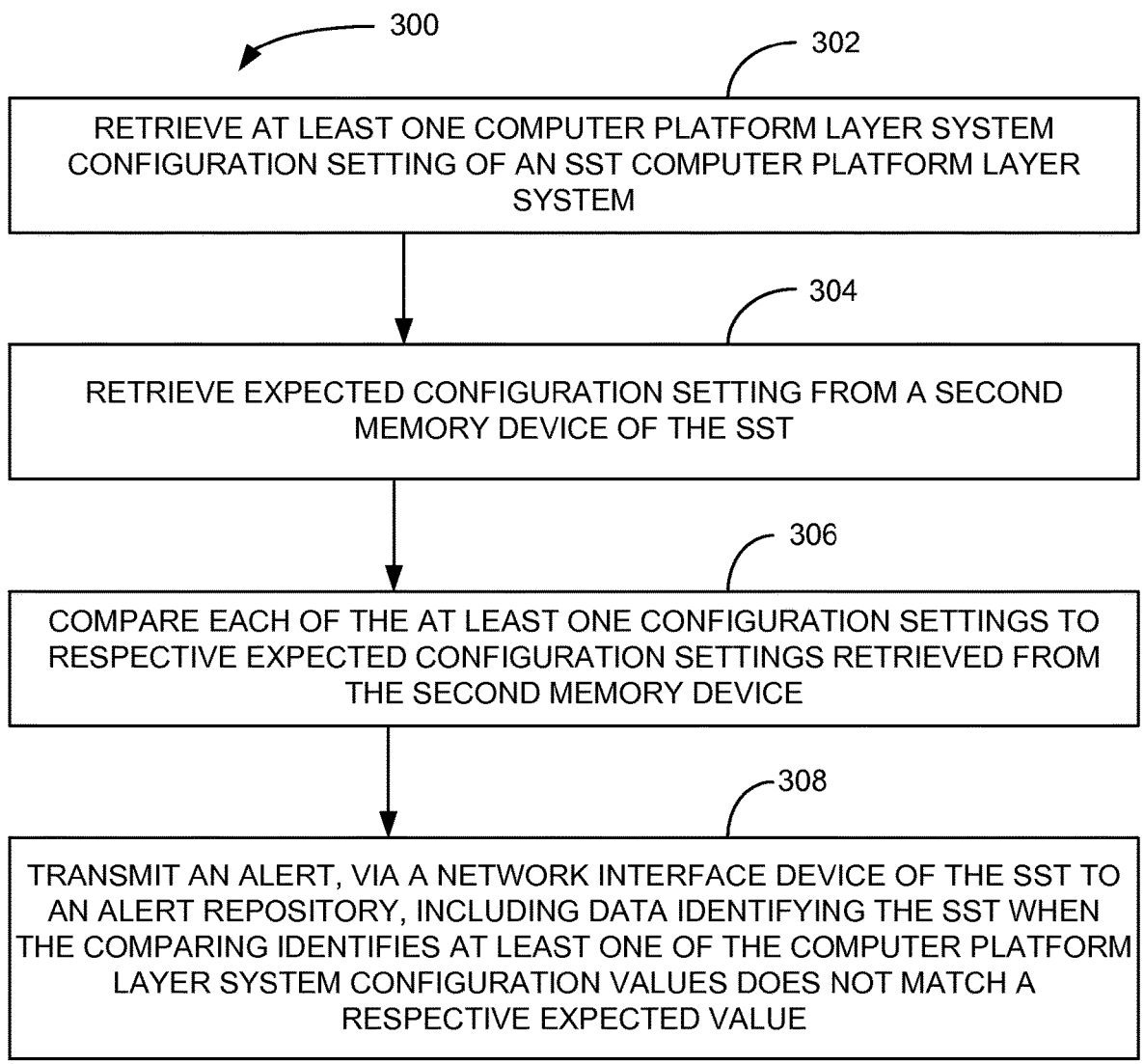
FIG. 3 is a block flow diagram of a method, according to an example embodiment.

FIG. 3 is a block flow diagram of a method 300, according to an example embodiment. The method 300 is another example of a method that may be performed by a computer platform layer system, a platform layer system monitoring and alerting module, or other element at the platform layer of a computer controlling operation of an SST or other computer.

The method 300 includes retrieving 302 at least one computer platform layer system configuration setting of an SST computer platform layer system and retrieving 304 expected configuration setting from a second memory device of the SST. The method 300 then compares 306 each of the at least one configuration settings to respective expected configuration settings retrieved from the second memory device. When the comparing 306 identifies at least one of the computer platform layer system configuration values does not match a respective expected value, the method 300 includes transmitting 308 an alert, via a network interface device of the SST to an alert repository, including data identifying the SST.

The at least one computer platform layer system configuration setting is retrieved 302 in some embodiments via an interface of the computer platform layer system. In other embodiments, the at least one computer platform layer system configuration setting is retrieved 302 from a memory location where the at least one configuration setting is stored.

Figure 4:
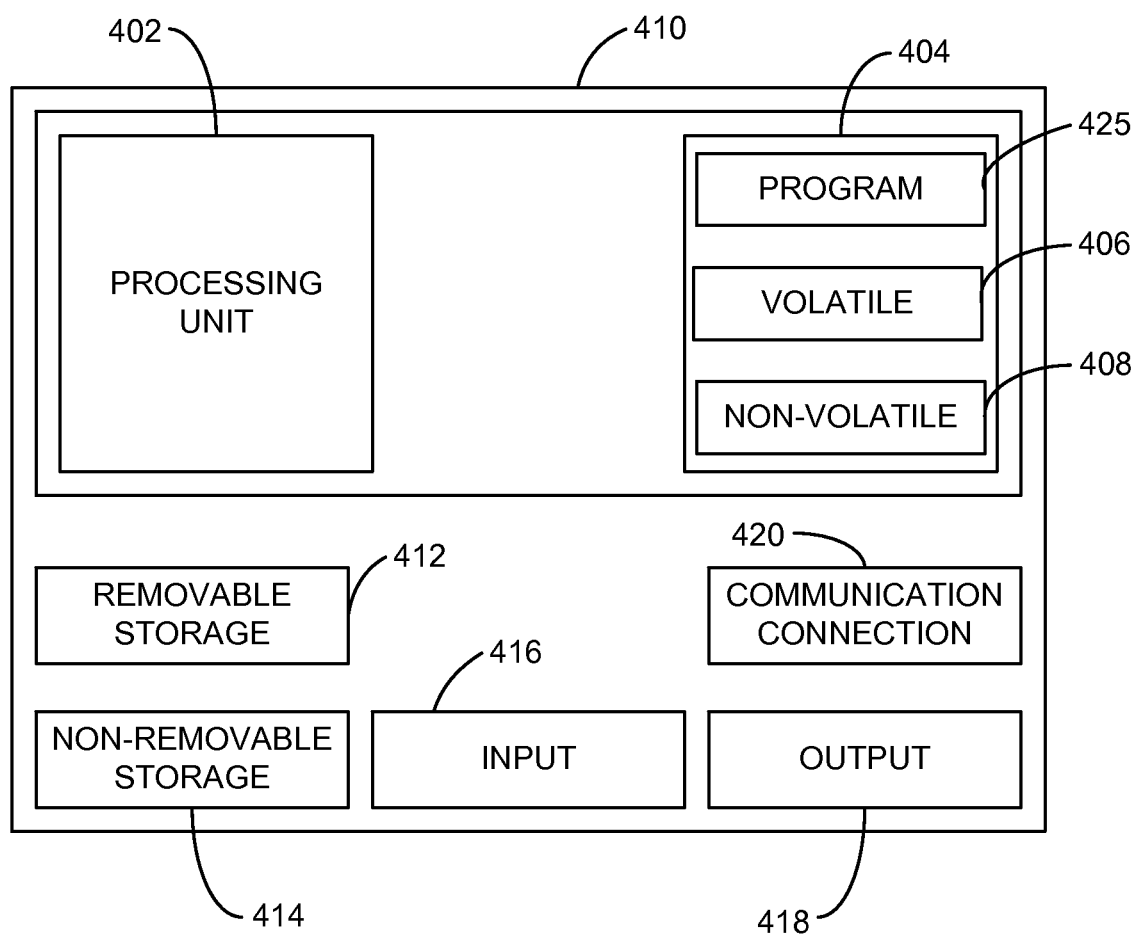
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment, such as in each of the ATM 102, the enterprise management system 108, and banking system 106, each of FIG. 1. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    comparing at least one computer platform layer system configuration setting retrieved from a computer platform layer memory device of a Self-Service Terminal (SST) to respective expected values stored in a second memory device of the SST, the at least one computer platform layer system configuration setting includes at least one boot device order configuration setting;
    transmitting an alert via a secure network to an alert repository of a terminal management system including data identifying the SST when the comparing identifies at least one of the computer platform layer system configuration values does not match a respective expected value;
    taking and keeping, by the SST, the SST offline to prevent fraudulent activity; and
    wherein the method is performed on an application-specific hardware device embedded within or coupled to a motherboard of a computer on which the computer platform layer system executes, the application-specific hardware device performing the method out of band.

2. The method of claim 1, wherein the computer platform layer system is a Basic Input/Output System (BIOS).

3. The method of claim 1, wherein the computer platform layer system is a Unified Extensible Firmware Interface (UEFI).

4. The method of claim 1, wherein the alert is transmitted via the secure network to the alert repository of an SST Management System.

5. The method of claim 1, wherein the second memory device is non-volatile secured memory device.

6. A method comprising:
    retrieving at least one computer platform layer system configuration setting of a Self-Service Terminal (SST) computer platform layer system;
    retrieving expected configuration setting from a second memory device of the SST;
    comparing each of the at least one configuration settings to respective expected configuration settings retrieved from the second memory device, the at least one computer platform layer system configuration setting includes at least one boot device order configuration setting; and
    transmitting an alert, via a secure network interface device of the SST to an alert repository of a terminal management system, including data identifying the SST when the comparing identifies at least one of the computer platform layer system configuration values does not match a respective expected value;
    taking and keeping, by the SST, the SST offline to prevent fraudulent activity; and
    wherein the method is performed on an application-specific hardware device embedded within or coupled to a motherboard of a computer on which the computer platform layer system executes, the application-specific hardware device performing the method out of band.

7. The method of claim 6, wherein the at least one computer platform layer system configuration setting is retrieved via an interface of the computer platform layer system.

8. The method of claim 6, wherein the computer platform layer system is a Basic Input/Output System (BIOS).

9. The method of claim 6, wherein the computer platform layer system is a Unified Extensible Firmware Interface (UEFI).

10. The method of claim 6, wherein an out-of-band controller performs the retrieving of the at least one configuration setting and expected configuration settings, the comparing, and the transmitting.

11. The method of claim 6, wherein the SST is a self-service checkout terminal.

12. An SST system comprising:
a motherboard with at least one processor and at least one memory device thereon, the at least one memory device storing a platform layer system, and configuration settings thereof, the platform layer system executable according to the configuration settings by the at least one processor to perform platform layer services for the system including executing a system boot process;
a network interface device; and
a platform layer system monitoring and alerting hardware module embedded within or coupled to the motherboard operable to perform out of band data processing activities comprising:
  retrieving at least one computer platform layer system configuration setting from the at least one memory device, the retrieved at least one computer platform layer system configuration setting includes at least one boot device order configuration setting;
  retrieving expected configuration setting from the at least one memory device;
  comparing each of the at least one configuration settings to respective expected configuration settings;
  taking and keeping the SST offline to prevent fraudulent activity; and
  transmitting an alert, via the network interface device to an alert repository of a terminal management system, including data identifying the SST when the comparing identifies at least one of the computer platform layer system configuration values does not match a respective expected value.

13. The SST system of claim 12, wherein the computer platform layer system is a Unified Extensible Firmware Interface (UEFI).

14. The SST system of claim 12, wherein the system is an Automated Teller Machine (ATM).

* * * * *